Aug. 1, 1967  H. E. EIRHART, JR  3,333,653
SPINDLE BALL GUIDE INDEPENDENT SUSPENSION SYSTEM
Filed June 17, 1965  4 Sheets-Sheet 1
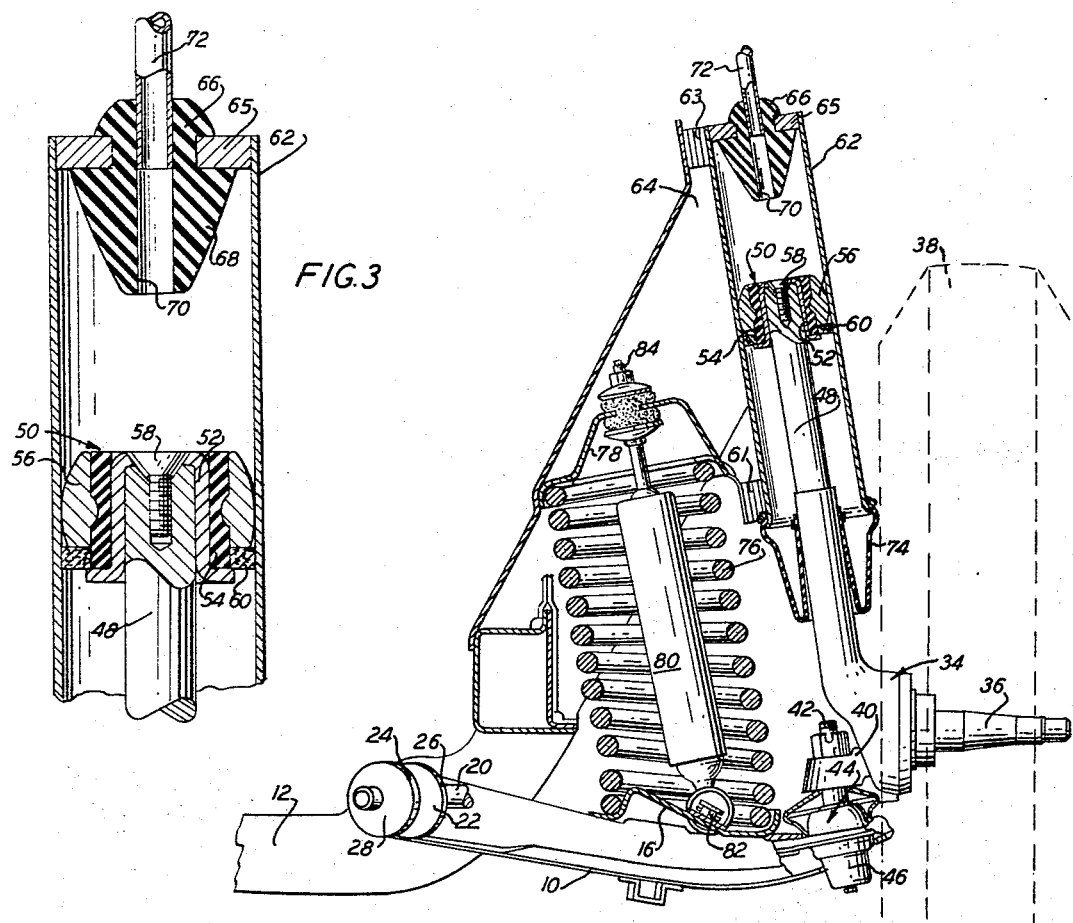
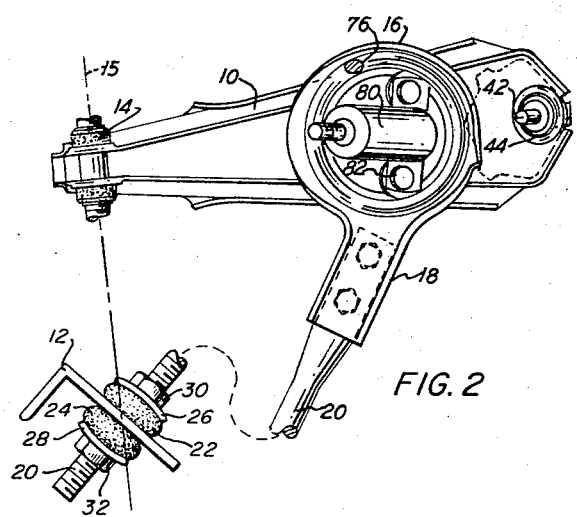
HARRY E. EIRHART, JR.
INVENTOR
BY John R. Faulkner
Clifford L. Sadler
ATTORNEYS

HARRY E. EIRHART, JR.
INVENTOR

# United States Patent Office 3,333,653
Patented Aug. 1, 1967

3,333,653
SPINDLE BALL GUIDE INDEPENDENT SUSPENSION SYSTEM
Harry E. Eirhart, Jr., Detroit, Mich., assignor to The Ford Motor Company, Dearborn, Mich., a corporation of Delaware
Filed June 17, 1965, Ser. No. 464,648
14 Claims. (Cl. 180—73)

The present invention relates generally to motor vehicle suspension systems, and more particularly to an independent suspension known as a spindle ball guide suspension.

In an independent wheel suspension system according to the present invention, the wheel supporting spindle is positioned by a lower suspension arm and by a vertical extension from the spindle which has a ball-shaped member formed at its end. A tubular member is secured to the frame of the vehicle and serves as a guide for the ball.

The use of a sliding guide member for a portion of the spindle is not entirely new. In the prior art devices, however, the tube is usually resiliently mounted to permit jounce and rebound deflection of the wheel and its spindle. In those devices, the spindle extension and the tube are maintained in coaxial alignment. In the present case, the ball guide or tube is rigidly secured to the vehicle frame and the spindle extension has, in effect, a point contact so that the tube guides only the end of the spindle extension and the spindle itself is free to pivot about the ball.

The principal disadvantage of the prior art devices is that they provide journals for controlling linear movement of the spindle. These journals tend to bind and exhibit substantial break-away friction which causes "ride harshness" during operation of the suspension in a vehicle. These disadvantages of the prior art devices are not present in constructions of the present invention. The spindle is not restricted to a linear path but rather it is free to move and pivot about the contact between the ball with the guide tube.

In addition to providing improved operation by means of reduced friction, the present invention has superior suspension geometry characteristics. The sliding pillar designs of the prior art have positive camber during wheel jounce movement while the spindle ball guide suspension, which oscillates during vertical movement, can provide negative camber in jounce during roll motion of the vehicle. This inherent geometry change provides superior handling characteristics due to higher anti-roll forces, and also gives a softer ride without the jerky effect of a sliding journal construction.

As compared with a suspension system having upper and lower lateral arms to position the wheel supporting spindle, the spindle ball guide suspension has superior characteristics. The first of these is the reduction of weight by the elimination of the upper suspension arm and its attaching parts. A suspension according to the present invention provides maximum engine compartment space by the elimination of the upper arm while retaining desirable ride and handling characteristics of independent suspensions having upper and lower arms. Due to the spindle's upper ball pivot being located in a high position, loads created on brake spike stops and pot hole encounters are smaller in magnitude than obtained with present independent front suspension systems. This feature will reduce structural requirements at the upper attachment. A camber path can be obtained with relatively low rate of change in the slope and no reversal in direction over the range of wheel travel. Such a wheel path will suppress wheel fight, give a moderate anti-roll force component in jounce and a large anti-roll force component in rebound. The combined anti-roll forces can be made to equal over one half of the lateral weight transfer and may be sufficient in certain applications to permit the eliminations of the anti-sway or stabilizer bar. This results in additional weight saving and cost reduction.

Anti-dive at the front and anti-brake lift at the rear are obtainable by appropriately inclining the guide tube for the spindle ball. These features are not obtainable on the conventional pillar type suspension systems.

The many objects and advantages of the present invention will become apparent from the following discussion and the accompanying drawings in which:

FIGURE 1 is a front elevational view partly in section of an independent front suspension incorporating an embodiment of the present invention;

FIGURE 2 is a top plan view of a lower suspension arm;

FIGURE 3 is an enlarged sectional view of the spindle ball guide portion of the suspension;

Figure 4:
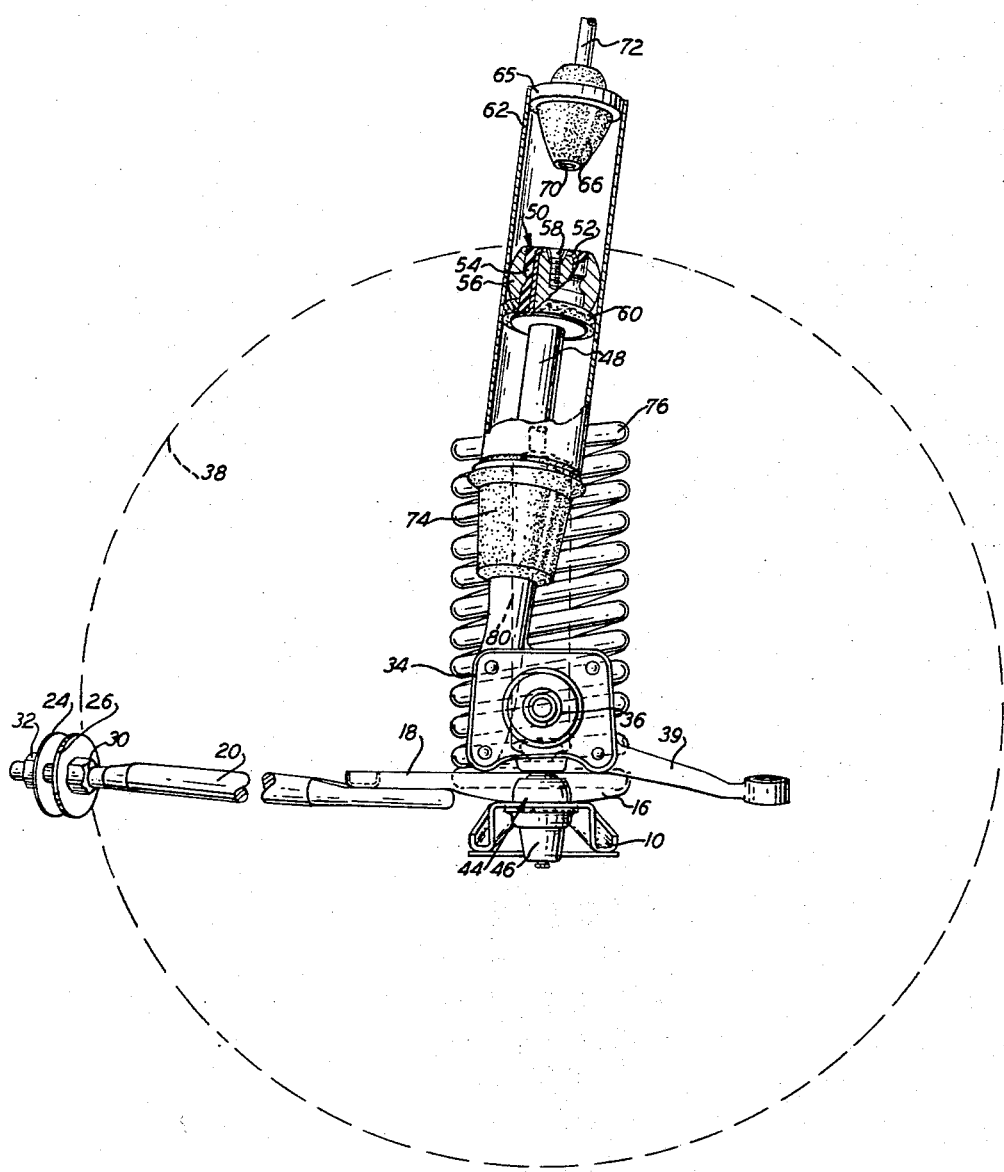
FIGURE 4 is a side elevational view partly in section of the suspension of FIGURE 1.

Referring now to the drawings for a more complete understanding of the present invention, FIGURE 1 illustrates a front independent suspension incorporating one of its preferred embodiments. In FIGURE 1, a lower suspension arm 10 is connected to vehicle body support structure or frame 12 by means of a resilient bushing 14 that is best seen in FIGURE 2. A circular spring seat 16 is welded to the arm 10 and has a forwardly extending portion 18 to which a drag strut 20 is secured by bolts. The drag strut 20 is of forged rod construction.

The forward end of the drag strut 20 is secured to the vehicle body support structure 12 by means of a pair of spaced apart resilient bushings 22 and 24. These members are of doughnut shape and are slipped over the end of the drag strut 20 and positioned by washers 26 and 28 which, in turn, are positioned by nuts 30 and 32 that are threadedly received on the end of the drag strut 20. This connection provides a resilient pivotal attachment for the drag strut. It is the principal function of the drag strut to resist longitudinal displacement of the suspension arm 10.

The pivot axis 15 for the bushing 14 passes through the portion of the drag strut located between the rubber bushings 22 and 24. This permits the assembly comprising the arm 10 and the drag strut 20 to traverse a jounce and rebound path about the common pivot axis 15.

A wheel spindle 34 is provided with a stub shaft 36 that is adapted to rotatably support a road wheel 38. The spindle 34 is provided with an inwardly extending eye portion 40 to which the stud 42 of a ball joint assembly 44 is secured. The socket portion of the assembly 44 is identified by the reference numeral 46 and is secured to the outer end of the lower suspension arm 10. The ball joint 44 provides an articulated connection between the suspension arm 10 and the spindle 34 to permit the wheel 38 to traverse a jounce and rebound path as well as turn about a steering axis. The wheel spindle 34 includes a steering arm 39 which is adapted to be connected to the steering linkage of the vehicle's steering system.

The spindle 34 is provided with a vertically extending shank portion 48 to which a ball assembly 50 is secured. The ball assembly comprises a hat-shaped metal retainer 52 to which a rubber cylindrical element 54 is bonded. An annular plastic bearing 56 is secured to the rubber element 54 by means of an interlocking groove and ridge. A screw 58 passes through the retainer 52 and secures the ball assembly 50 onto the end of the shank 48. An annular felt wiper 60 also forms a part of the assembly 50 and is secured by the retainer 52.

A guide tube 62 is secured to the super-structure portions 64 of the body support structure 12. In the preferred embodiment, this connection is of a rigid type and includes spacing shims 61 and 63 that are located at the upper and lower ends of the tube 62. These shims may be provided in lesser or greater number according to the requirements of the suspension in order to position the tube 62 at the proper angle for providing the desired suspension geometry characteristics.

The tube 62 has an internal diameter that is equal to or slightly greater than the external diameter of the bearing member 56. It is noted that the bearing member 56 is provided with a spherical exterior bearing surface to permit rocking of the end of the spindle extension 48 in the tube 62. The felt wiper 60 engages the internal wall of the tube 62 and serves to prevent the entrance of dirt and the expulsion of lubricants from the tube interior above the ball assembly 50.

The upper end of the tube 62 is closed by an annular member 65 to which a rubber jounce stop 66 is secured. The stop 66 has a generally conical end portion 68 that is directed toward the end of the ball assembly 50. This construction serves as a resilient limiting device to restrict extreme jounce deflection of the wheel 38.

The interior of the jounce stop 66 is bored out as indicated at 70 to permit attachment of a breather tube 72. The tube 72 is open to atmosphere through an appropriate filter device. This prevents a pressure buildup or vacuum from being formed in the tube above the ball guide assembly 50 during reciprocation of the spindle.

The lower end of the ball guide tube 62 is closed by a boot seal 74 which has one end in sealed engagement with the tube 62 and another end in sealed engagement with the spindle extension 48. This construction prevents the entry of contaminants into the interior of the tube 62. Such contaminants could score the inner wall of the tube 62 and destroy the bearing surface of the bearing 56.

The vehicle body including the support structures 12 and 64 is resiliently supported on the wheel 38 by a coil spring 76. The lower end of the coil spring 76 is seated on the spring seat 16 of the lower suspension arm 10. A spring retaining structure 78 is welded to the support super-structure 64 and provides a seat for the upper end of the spring 76. A telescopic hydraulic shock absorber 80 is axially disposed within the spring 76 and has its lower end pivotally connected to the spring seat 16 by a bar pin 82. A bayonet or spike type attachment is used to secure the piston rod 84 of the shock absorber 80 to the retaining structure 78. This assembly supports the vehicle body on the suspension for jounce and rebound movement.

With this suspension system, the spindle 34 is free to move up and down and pivot about the point of contact between the ball assembly 50 and the tube 62. The tube 62 may be inclined at any desired manner to provide the suspension geometry that is desired. For a front suspension, the guide tube is tilted inwardly at the top to achieve negative camber in jounce and positive camber in rebound. This provides high anti-roll forces. For anti-brake dive at the front suspension, the guide tube should be tilted back at the top. The tube need not be of truly cylindrical construction but may have a non-linear axis to provide special geometry for wheel movements.

The suspension of the present invention is also readily adaptable to other types of spring mediums. A coil spring has been shown for illustrative purposes, however, a torsion bar spring is equally applicable and, in fact, is illustrated in the embodiment shown in FIGURE 5. The present invention is also readily adaptable to a hydro-pneumatic suspension by providing a fluid tight seal 160 between the ball assembly 50 and the tube 62. In this case, the upper end of the guide tube is charged with hydraulic fluid and the bleed tube 172 is connected to a hydro-pneumatic spring device 176. The hydro-pneumatic suspension device 176 is illustrated and described in Patent 3,041,062 which issued to C. V. Bliven on June 26, 1962.

Figure 5:
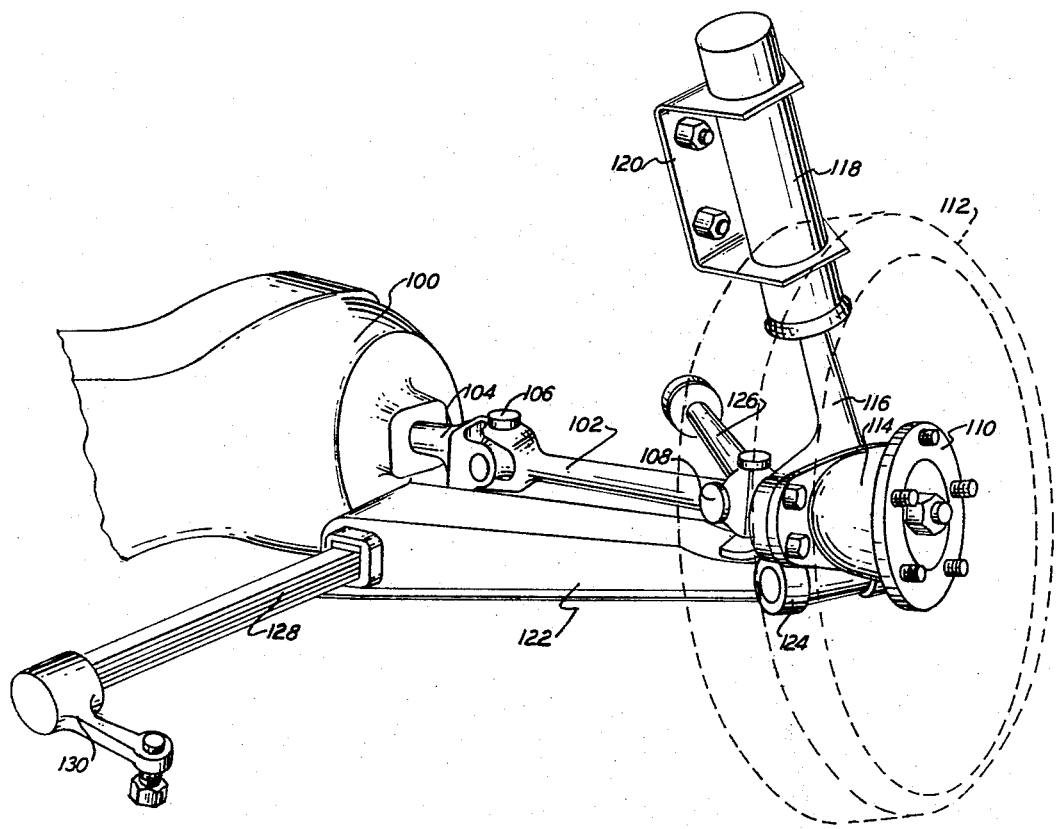
FIGURE 5 is a perspective view of a rear suspension system incorporating the present invention.
Figure 6:
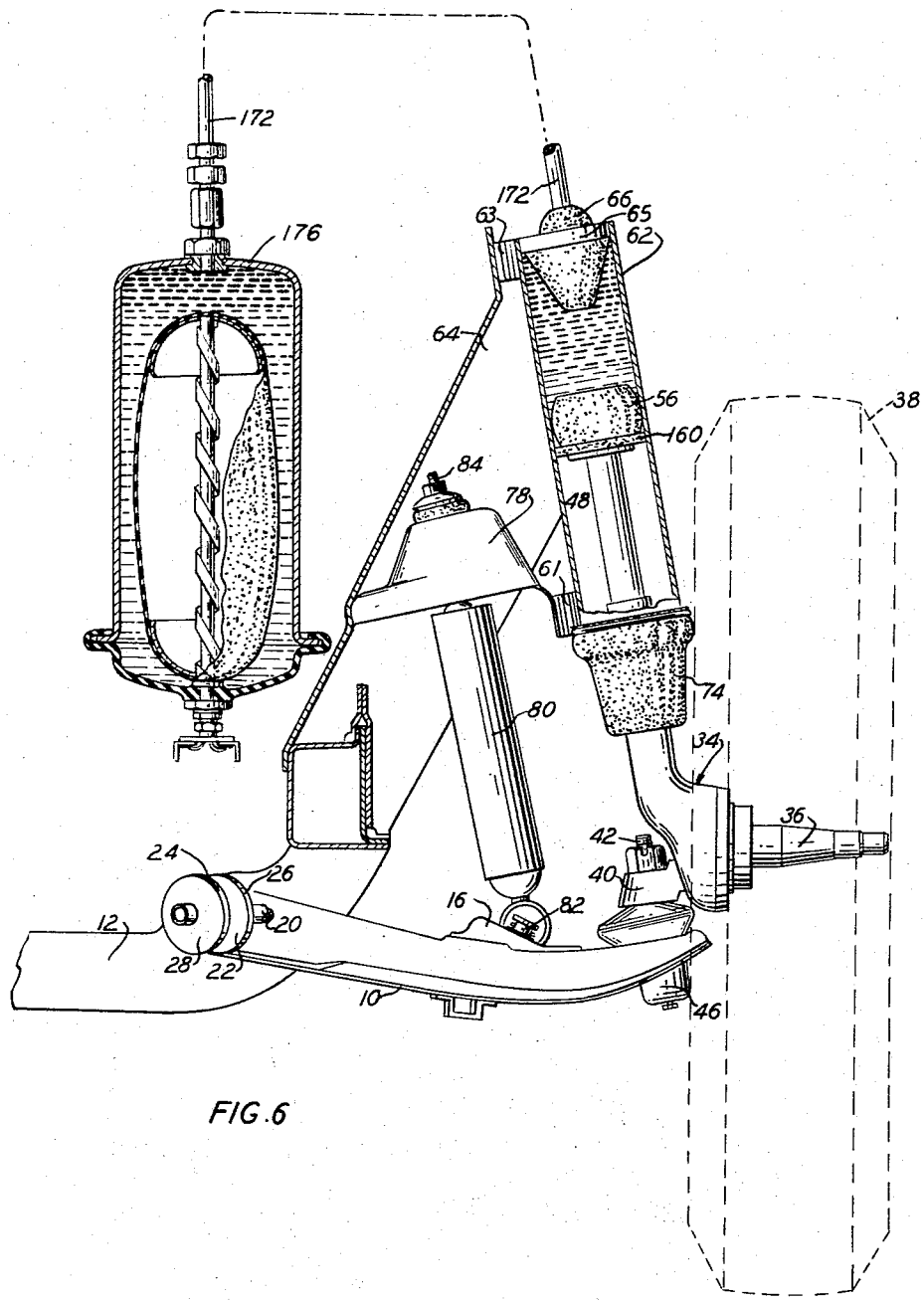
FIGURE 6 is a front elevational view similar to FIGURE 1 showing the invention in a hydro-pneumatic suspension system.

An embodiment of the present invention, adapted for an independent rear suspension system having driving wheels, is illustrated in FIGURE 5. In this view, a power differential 100 has a laterally extending output shaft 104 that is connected to the inner end of a drive shaft 102 by a universal joint 106. The outer end of the shaft 102 is connected to a second universal joint 108 which, in turn, is connected to a stub shaft not shown. The stub shaft is, in turn, connected to a wheel attaching flange 110. The road wheel 112 is drivingly connected to the flange 110. The stub shaft is rotatably supported in a wheel bearing housing 114 which, thus, also supports the wheel 112.

A member 116 is rigidly connected to the wheel bearing housing 114 and has a vertically extending portion similar to the extending portion 48 of the spindle 34 of FIGURE 1. The upper end of the extending portion incorporates a ball assembly which is slidably supported in a guide tube 118. A bracket 120 is adapted to be rigidly affixed to a support member of the vehicle.

The wheel bearing housing 114 is also positioned by a laterally extending suspension arm 122 which has a pivotal connection with the chassis of the vehicle. The outer end of the arm 122 is pivotally connected by a bushing 124 to the wheel support member 116. A drag strut 126 extends rearwardly at an angle from the outer end of the lower arm 122. The rear end of the drag strut 126 is pivotally connected by a rubber bushing to the vehicle support structure. The drag strut 126 provides longitudinal support for the suspension arm 122 and the wheel bearing housing 114.

The vehicle chassis is resiliently supported on the suspension system by torsion bar 128 which comprises a plurality of flat leaf spring laminations. One end of the torsion bar 128 is nonrotatably connected to the suspension arm 122 and the other end is adjustably connected by device 130 to the chassis of the vehicle. This construction permits the arm to move up and down as dictated by the jounce and rebound of the wheel 112 against the resilient support of the spring 128. The adjustable feature of the device 130 provides a means for establishing the preload at a specified amount so that the vehicle body will be positioned at its designed attitude.

The spindle ball guide comprising the members 116 and 118 of the suspension of FIGURE 5 functions in the same fashion as the suspension of FIGURE 1. The guide 118 may be set at an appropriate angle to provide certain desirable suspension geometry characteristics such as anti-lift.

Used at the rear wheels, a suspension in accordance with the present invention permits independent wheel movement, has minimum unsprung weight, and has satisfactory geometry characteristics. Usually swing arm rear independent suspensions have an extremely high roll center with a radial wheel path that causes a large lifting force on the outside wheel when cornering the vehicle. With a swing arm geometry, the car rises due to the lift component of the cornering force, and if it is great enough to overcome the lateral weight transfer, the outside wheel goes into rebound, in the rebound position, the wheel has large positive camber which causes a considerable loss in cornering power and with traction force applied, the cornering force decreases enough to permit rear end oversteer.

With an upper spindle ball guide according to the present invention, the roll center is maintained at a lower height and the wheel path is more vertical. The anti-roll force in jounce is not sufficient to raise the car and the cornering power remains high. As in the case of the front suspension, negative camber in jounce and positive camber in rebound may be achieved by tilting the top of the guide tube 118 inwardly.

Any required amount of roll understeer may be obtained by having the control arm axes converge inward at the rear pivots in the plan view. Anti-brake lift can be incorporated by tilting the spindle ball guide tube 118 so that the upper ball moves forward in jounce. This is achieved by tilting the tube 118 forwardly at the top. With the control arm pivot axis parallel to the ground, the resultant path of the tire contact area is forward during wheel rebound. The angle of this path determines the magnitude of a force vector opposed to the body rise due to weight transfer when braking.

The foregoing description presents the presently preferred embodiments of this invention. Alterations and modifications may occur to those skilled in the art which will come within the scope and spirit of the following claims.

As used in the appended claims, the term "frame" refers to any support structure of the vehicle chassis whether integral or separable from the body sheet metal.

I claim:

1. A suspension system for a motor vehicle having a supporting frame and a road wheel,
   a wheel support member rotatably supporting said wheel,
   a vertically extending portion connected to said wheel support member,
   the upper end of said portion having a spherical bearing secured thereto,
   a guide member having a generally tubular form secured to said frame structure,
   said spherical bearing being slidably received in engagement with the interior wall of said guide member,
   said guide member being constructed to define a path for the vertical displacement of said bearing and the upper end of said portion during jounce and rebound movement of said road wheel,
   suspension spring means constructed and arranged to support said frame upon said wheel.

2. A suspension system for a motor vehicle having a supporting frame and a road wheel,
   a wheel support member rotatably supporting said wheel,
   a laterally extending suspension arm having its outer end pivotally connected to said wheel support member and its inner end pivotally connected to said frame,
   a vertically extending portion connected to said wheel support member,
   the upper end of said portion having a spherical bearing secured thereto,
   a guide member having a generally tubular form secured to said frame structure,
   said spherical bearing being slidably received in said guide member,
   a torsion suspension spring interposed between said suspension arm and said frame,
   said guide member being inclined inwardly and forwardly at its upper end to provide desired suspension characteristics.

3. A suspension system for a motor vehicle having a supporting frame and a road wheel,
   a wheel support member rotatably supporting said wheel,
   laterally extending drive shaft means drivingly connected to said wheel and rotatably supported by said wheel support member,
   a vertically extending portion connected to said wheel support member,
   the upper end of said portion having a spherical bearing secured thereto,
   a guide member having a generally tubular form secured to said frame structure,
   said spherical bearing being slidably received in said guide member,
   suspension spring means constructed and arranged to support said frame upon said wheel.

4. A suspension system for a motor vehicle having a supporting frame and a road wheel,
   a wheel support member rotatably supporting said wheel,
   a laterally extending suspension arm having its outer end pivotally connected to said wheel support member and its inner end pivotally connected to said frame,
   laterally extending drive shaft means drivingly connected to said wheel and rotatably supported by said wheel support member,
   a vertically extending portion connected to said wheel support member,
   the upper end of said portion having a spherical bearing secured thereto,
   a guide member having a generally tubular form rigidly secured to said frame structure,
   said spherical bearing being slidably received in said guide member,
   a main torsion suspension spring interposed between said suspension arm and said frame,
   said guide member being inclined inwardly and forwardly at its upper end to provide desired suspension characteristics.

5. A suspension system for a motor vehicle having a supporting frame and a road wheel,
   a wheel support member rotatably supporting said wheel,
   a laterally extending suspension arm having its outer end universally connected to said wheel support member and its inner end pivotally connected to said frame,
   said wheel support member having means constructed for connection to a steering linkage and adapted to turn said wheel support member about a steering axis in response to movement of said linkage,
   a vertically extending portion connected to said wheel support member,
   the upper end of said portion having a spherical bearing secured thereto,
   a guide member having a generally tubular form rigidly secured to said frame structure,
   said spherical bearing being slidably received in said guide member,
   the interior portion of said tubular guide member above said spherical bearing being open to atmospheric pressure,
   a main suspension spring interposed between said suspension arm and said frame,
   said guide member being inclined inwardly and rearwardly at its upper end to provide desired suspension characteristics.

6. A suspension system for a motor vehicle having a supporting frame and a road wheel,
   a wheel support member rotatably supporting said wheel,
   a laterally extending suspension arm having its outer end universally connected to said wheel support member and its inner end pivotally connected to said frame,
   said wheel support member having means constructed for connection to a steering linkage and adapted to turn said wheel support member about a steering axis in response to movement of said linkage,
   a vertically extending portion connected to said wheel support member,
   the upper end of said portion having a spherical bearing secured thereto,
   a guide member having a generally tubular form secured to said frame structure,
   said spherical bearing being slidably received in said guide member,
   said guide member being inclined inwardly and rearwardly at its upper end to provide desired suspension characteristics.

7. A suspension system for a motor vehicle having a supporting frame and a road wheel,
a wheel support member rotatably supporting said wheel,
a laterally extending suspension arm having its outer end universally connected to said wheel support member and its inner end pivotally connected to said frame,
said wheel support member having means constructed for connection to a steering linkage and adapted to turn said wheel support member about a steering axis in response to movement of said linkage,
a vertically extending portion connected to said wheel support member,
the upper end of said portion having a spherical bearing secured thereto,
a guide member having a generally tubular form secured to said frame structure,
said spherical bearing being slidably received in said guide member,
the interior portion of said tubular guide member above said spherical bearing being open to atmospheric pressure,
a main suspension spring interposed between said suspension arm and said frame.

8. A suspension system for a motor vehicle having a supporting frame and a road wheel,
a wheel support member rotatably supporting said wheel,
a laterally extending suspension arm having its outer end pivotally connected to said wheel support member and its inner end pivotally connected to said frame,
a vertically extending portion connected to said wheel support member,
the upper end of said portion having a spherical bearing secured thereto,
a guide member having a generally tubular form secured to said frame structure,
said spherical bearing being slidably received in engagement with the interior wall of said guide member,
said guide member being inclined inwardly and forwardly at its upper end to provide desired suspension characteristics.

9. A suspension system for a motor vehicle having a supporting frame and a road wheel,
a wheel support member rotatably supporting said wheel,
a laterally extending suspension arm having its outer end pivotally connected to said wheel support member and its inner end pivotally connected to said frame,
a vertically extending portion connected to said wheel support member,
the upper end of said portion having a spherical bearing secured thereto,
a guide member having a generally tubular form secured to said frame structure,
said spherical bearing being slidably received in engagement with the interior wall of said guide member,
said guide member being inclined inwardly and rearwardly at its upper end to provide desired suspension characteristics.

10. A suspension system for a motor vehicle having a supporting frame and a road wheel,
a wheel support member rotatably supporting said wheel,
a laterally extending suspension arm having its outer end pivotally connected to said wheel support member and its inner end pivotally connected to said frame,
a vertically extending portion connected to said wheel support member,
the upper end of said portion having a spherical bearing secured thereto,
a guide member having a generally tubular form secured to said frame structure,
said spherical bearing being slidably received in sealed engagement with the interior wall of said guide member,
the interior portion of said tubular guide member above said spherical bearing being filled with hydraulic fluid,
means sealing the upper end of said guide member and constructed for connection to a resilient device for resiliently supporting said frame on said wheels.

11. A suspension system for a motor vehicle having a supporting frame and a road wheel,
a wheel support member rotatably supporting said wheel,
a laterally extending suspension arm having its outer end universally connected to said wheel support member and its inner end pivotally connected to said frame,
said wheel support member having means constructed for connection to a steering linkage and adapted to turn said wheel support member about a steering axis in response to movement of said linkage,
a vertically extending portion connected to said wheel support member,
the upper end of said portion having a spherical bearing secured thereto,
a guide member having a generally tubular form rigidly secured to said frame structure,
said spherical bearing being slidably received in sealed engagement with the interior wall of said guide member,
the interior portion of said tubular guide member above said spherical bearing being filled with hydraulic fluid,
means sealing the upper end of said guide member and constructed for connection to a resilient device for resiliently supporting said frame on said wheels.

12. A suspension system for a motor vehicle having a supporting frame and a road wheel,
a wheel support member rotatably supporting said wheel,
a laterally extending suspension arm having its outer end pivotally connected to said wheel support member and its inner end pivotally connected to said frame,
an upwardly extending portion connected to said wheel support member,
the upper end of said portion having a spherical bearing secured thereto,
a guide member having a generally tubular form secured to said frame structure,
said spherical bearing being slidably received in engagement with the interior wall of said guide member,
said guide member being inclined to a vertical line whereby a path of movement for said spherical bearing is defined that will produce forces counteracting the normal tendency of said frame to move vertically upon braking of said motor vehicle.

13. A suspension system for a motor vehicle having a supporting frame and a road wheel,
suspension means interposed between said frame and said wheel constructed to define a jounce and rebound path for said wheel relative to said frame,
said suspension means including a wheel support member rotatably supporting said wheel,
an upwardly extending portion connected to said wheel support member,
the upper end of said portion having a bearing means secured thereto, a guide member having a generally tubular form substantially rigidly secured to said frame structure,
said bearing means being slidably received in engagement with the interior wall of said guide member and constructed for angular displacement of the axis of said upwardly extending portion with respect to the axis of said guide member during jounce and rebound movement of said wheel.

14. The combination of claim 13 wherein said guide member is inclined to a vertical line whereby a jounce and rebound path is provided for said bearing means that will produce forces counteracting the normal tendency of said frame to move vertically upon braking of said motor vehicle.

References Cited
UNITED STATES PATENTS

| | | | |
|---|---|---|---|
| 1,711,881 | 5/1929 | Fornaca | 280—96.2 X |
| 2,437,844 | 3/1948 | Wahlberg et al. | 280—96.2 |

A. HARRY LEVY, *Primary Examiner.*